United States Patent [19]
Van Curen et al.

[11] Patent Number: 5,799,618
[45] Date of Patent: Sep. 1, 1998

[54] COMBINATION CONFINEMENT SYSTEM AND BARK INHIBITOR

[75] Inventors: Greg Van Curen, Fremont; Michael D. Westrick, Fort Wayne, both of Ind.

[73] Assignee: Innotek, Inc., Garrett, Ind.

[21] Appl. No.: 695,883

[22] Filed: Aug. 12, 1996

[51] Int. Cl.⁶ .................................................. A01K 15/04
[52] U.S. Cl. ........................ 119/721; 119/718; 119/859; 119/908
[58] Field of Search ..................... 119/718, 720, 119/721, 859, 908; 340/573

[56] References Cited

U.S. PATENT DOCUMENTS

| | | | |
|---|---|---|---|
| 4,202,293 | 5/1980 | Gonda et al. | 119/718 |
| 4,627,385 | 12/1986 | Vinci | 119/718 |
| 4,745,882 | 5/1988 | Yarnall, Sr. et al. | 119/721 |
| 4,887,549 | 12/1989 | Powell | 119/718 |
| 4,898,120 | 2/1990 | Brose | 340/573 |
| 4,947,795 | 8/1990 | Farkas | 119/718 |
| 4,967,695 | 11/1990 | Giunta | 119/721 |
| 5,046,453 | 9/1991 | Vinci | 119/718 |
| 5,067,441 | 11/1991 | Weinstein | 119/721 |
| 5,207,178 | 5/1993 | McDade et al. | 340/573 |
| 5,207,179 | 5/1993 | Arthur et al. | 340/573 |
| 5,349,926 | 9/1994 | McCarney et al. | 119/721 |
| 5,353,744 | 10/1994 | Custer | 119/719 |
| 5,435,271 | 7/1995 | Touchton et al. | 119/721 |
| 5,559,498 | 9/1996 | Westrick et al. | 119/721 |
| 5,601,054 | 2/1997 | So | 119/718 |

Primary Examiner—Edgar S. Burr
Assistant Examiner—Amanda B. Sandusky
Attorney, Agent, or Firm—Barnes & Thornburg

[57] ABSTRACT

A combined animal confinement and bark inhibitor system includes a confinement circuit which receives a confinement transmitter signal and outputs a confinement control signal, a sensor which detects the vibration of an animal's vocal cords and outputs a sensor control signal in response to that vibration, a stimulation device which provides a stimulus to the animal, and a controller associated with the confinement circuit, sensor, and the stimulation device, to selectively enable the stimulation device in response to a confinement control signal, a sensor control signal, or both.

17 Claims, 3 Drawing Sheets

COMBINATION CONFINEMENT SYSTEM AND BARK INHIBITOR

BACKGROUND AND SUMMARY OF THE INVENTION

The present invention relates to a combination confinement and bark inhibitor system that is selectable between a confinement mode, a remote training mode, and a combined confinement and remote training mode.

Animal confinement systems are known. These systems typically include a wire that is buried beneath the ground or positioned above the ground to define an area in which it is desired to confine one or more animals or keep one or more animals away from. The confinement wire is connected to a transmitter that operates at a predetermined frequency. A receiver, tuned to the transmitter frequency, is fitted to each animal to be kept within or away from the confinement area. Typically, each receiver is attached to a collar that is worn by an animal. A stimulator unit, also fitted to the animal, is electrically associated with the receiver and administers a stimulus to the animal as it nears the confinement wire (i.e., the edge of the confinement boundary). The stimulus can be in a variety of forms including an audio signal, an electrical shock, both an audio signal and electrical shock, a spray, a mechanical stimulus, etc. The audio stimulus is typically either a beep or a prerecorded message. The electrical shock is typically administered via a pair of probes that are in contact with skin of the animal so that an electrical potential difference across the probes delivers a shock to the animal. In some systems, the level of electrical stimulus delivered to the animal increases if the animal continues to approach the wire. However, the intensity of the electrical stimulus is kept within tolerable limits in order to reduce the likelihood of physical or psychological injury to the animal.

Bark inhibitors or limiters are know. These devices typically include a sensor that detects barking and/or whining and administers a corrective stimulus to the animal in response to this undesired activity. This stimulus can be in a variety of forms including an audio signal, an electrical signal, both audio and electrical signals, a spray, a mechanical stimulus, etc. The audio stimulus may have the above-described characteristics of audio signals for confinement systems. In addition, the electrical stimulus may increase if the animal does not stop barking or whining. Furthermore, the intensity of the stimulus is limited, as discussed above.

It is often desirable to be able to both confine one or more animals as well as keep those animals from barking or whining. Currently, this requires the purchase and use of two different systems, a separate confinement system and a separate bark inhibitor or limiter system. The use of two separate systems is expensive because of the presence of such things as two separate collars and stimulator units. Furthermore, use of two separate systems is time consuming because one receiver and stimulator unit must be removed and replaced with another in order to change between modes, unless the animal is to wear both collars at the same time.

The present invention provides a combined animal confinement and bark inhibitor system that includes some or all of the above-described features associated with current separate confinement systems and bark inhibitors or limiters. An embodiment of the present invention includes a confinement circuit, a sensor, a stimulation device, and a controller. The confinement circuit is tuned to receive a confinement transmitter signal and output a confinement control signal in response to receipt of the confinement transmitter signal. The sensor detects vibration of vocal cords of the animal or audible sounds from the animal and outputs a sensor control signal in response to either vibration of the vocal cords of the animal or audible sounds from the animal. The stimulation device administers a stimulus to the animal. The controller is associated with the confinement circuit, sensor, and stimulation device. The controller is configured to selectively enable the stimulator to administer the stimulus to the animal in response to the confinement control signal, the sensor control signal, or both the confinement control signal and sensor control signal.

The controller may include a microprocessor, a microcontroller, or a decoder. The system may additionally include structure for fitting the stimulation device to the animal. The fitting structure may include a collar.

The corrective stimulus may be an electrical signal, an audio signal, a spray, or a mechanical stimulus. The mechanical stimulus may include tightening of a collar fitted to the animal.

The confinement transmitter signal may activate the stimulation device to keep the animal within an area, keep the animal away from an object, or keep the animal away from an area. In this embodiment, the controller may be further configured to increase in intensity level of the stimulus administered to the animal as the distance between the animal and a boundary of the area decreases or a distance between the animal and the object decreases. The stimulus may be an electrical signal having a voltage magnitude that is increased to increase the intensity level of the stimulus. The system may further include either a wire or at least one transducer that transmits the confinement transmitter signal.

The sensor may include a bark inhibitor. In this embodiment, the controller may be further configured to increase an intensity level of the stimulus administered to the animal after expiration of a predetermined period of time where the sensor control signal is still output by the sensor. This corrective stimulus may be an electrical signal having a voltage magnitude that is increased to increase the intensity level of the corrective stimulus.

The stimulation device may include at least one probe that delivers an electrical signal to the animal as the corrective stimulus.

The controller may be further configured so that the confinement control signal overrides the sensor control signal during substantially simultaneous occurrence of the confinement control signal and the sensor control signal. Alternatively, the controller may be further configured so that the sensor control signal overrides the confinement control signal during substantially simultaneous occurrence of the confinement control signal and the sensor control signal. Additionally, the controller may be further configured to enable the stimulation device to administer the corrective stimulus for a predetermined period of time to prevent over-stimulation of the animal.

The system may further include a magnetic switch associated with the controller. In this embodiment, the controller is configured by activating the magnetic switch to enable the stimulation device to administer the stimulus to the animal in response either only the confinement control signal, only the sensor control signal, or both the confinement control signal and the sensor control signal.

The system may additionally include a housing in which the sensor, stimulation device, and controller are disposed.

Other objects, advantages and novel features of the present invention will become apparent from the following detailed description of the invention when considered in conjunction with the accompanying drawings.

DETAILED DESCRIPTION OF THE DRAWINGS

An embodiment of a combined pet confinement and bark inhibitor system 10 of the present invention is shown installed and in use within an area 12. System 10 is designed to both confine animal 16 within boundary 14 and help prevent unwanted barking or whining from animal 16.

Figure 1:
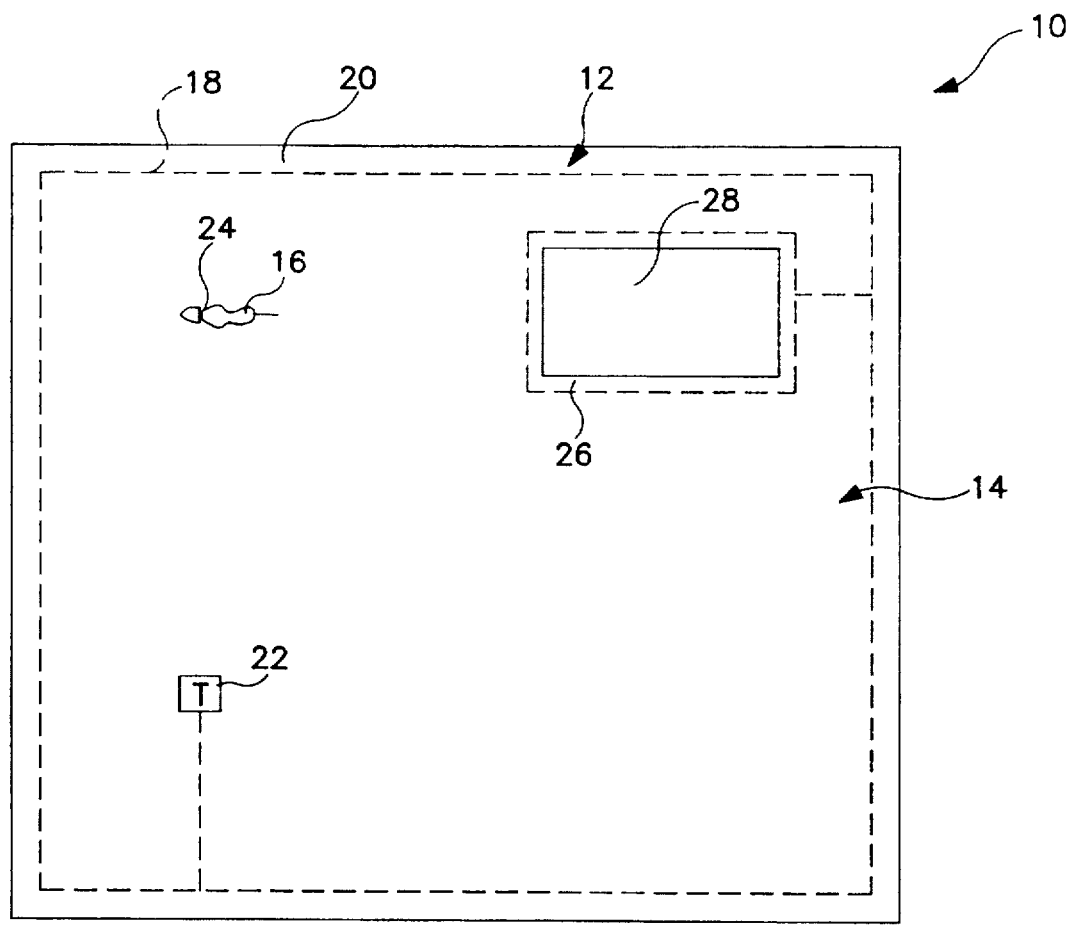
FIG. 1 is a top view of a combination animal confinement and bark inhibitor system of the present invention installed within a defined area.

The embodiment of system 10 shown in FIG. 1, includes a confinement transmitter 22 that includes a confinement wire 18 that may be buried beneath or positioned above ground 20 to define containment boundary 14 in which animal 16 is free to roam. Confinement wire 18 is electrically connected to transmitter 22 that causes confinement wire 18 to admit an electromagnetic signal of a predetermined frequency. Animal 16 is fitted with a collar 24 to which a receiver (not shown in FIG. 1) is coupled. This receiver is tuned to the frequency of transmitter 22 so that it receives the electromagnetic signal transmitted by transmitter 22 and confinement wire 18 when animal 16 roams within a predetermined distance of confinement wire 18. As animal 16 nears confinement wire 18, a processor (not shown in FIG. 1) causes a stimulator unit (also not shown in FIG. 1), attached to collar 24, to administer a stimulus to animal 16, such as a warning sound or tone via a speaker 33 shown in FIG. 3, an electrical shock, both a warning sound tone and an electrical shock, a spray, a mechanical stimulus, such as tightening of collar 24, or a combination of any of the above. This stimulus encourages animal 16 to stay within containment area 14. In one more embodiments of the present invention, the intensity of the electric stimulation administered to animal 16 is adjustable through a range of levels (i.e., intensities) which may be preset by a user of system 10. This embodiment may also automatically increase the intensity level of stimulation delivered to animal 16 if it ignores an initial corrective stimulus and continues to decrease the distance between it and confinement wire 18. Confinement wire 18 is also shown defining an area 26 around a pool or garden 28 from which animal 16 is to be kept.

Although not shown, an alternative embodiment of the present invention includes a transmitter operating at a predetermined frequency in lieu of confinement wire 18 and transmitter 22. The transmitter in this alternative embodiment defines a containment boundary (e.g., a circle of predefined radius) in which animal 16 is free to roam and directs or causes a stimulus to be administered to animal 16 when outside of the boundary. This transmitter may include a transducer.

System 10 may be designed to cease stimulation to animal 16 (i.e., time out) at a fixed time interval after the initiation of stimulation to animal 16. This feature prevents overstimulation of animal 16 in the event that it is unable or refuses to move away from confinement wire 18.

System 10 of the present invention also includes a bark inhibitor that is designed to encourage animal 16 to cease barking or whining. Barking or whining of animal 16 is detected via either vibrations of vocal cords of the animal detected by, for example, a transducer near the vocal cords of the animal, or audible sound detected by, for example, a microphone. The barking or whining detector is shown by block 35 in FIG. 3. In response to detection of barking or whining from animal 16, system 10 is designed to administer a corrective stimulus to the animal to encourage it to cease such activity. This corrective stimulus may be in a form of an electrical shock, a tone, a spray, a mechanical stimulus, or a combination of any of the above.

System 10 is selectively configurable between a confinement only mode, a bark inhibitor only mode, or both a confinement and bark inhibitor mode. This allows system 10 to be adapted to particular needs of a user at various times. For example, a user of system 10 may initially utilize both the confinement and bark inhibitor modes to both keep animal 16 within the boundary of his or her home and, at the same time, keep the animal from barking or whining. After the animal learns not to bark or whine, the user may select the confinement only mode to keep the animal within the desired boundary. As another example, the owner of animal 16 may select the bark inhibitor only mode to take animal 16 for a walk. After returning home, the combined confinement and bark inhibitor modes may be selected, as described above. This selectability makes system 10 easy to use and effective in reducing costs because two separate systems (i.e., confinement system and a bark inhibitor)do not have to be purchased. In addition, system 10 saves time because the collar worn by animal 16 does not have to be changed when switching between modes. The modes of system 10 may be prioritized such that when the confinement and bark inhibitor modes are both selected, confinement takes priority over bark inhibitor or vice versa.

Figure 2:
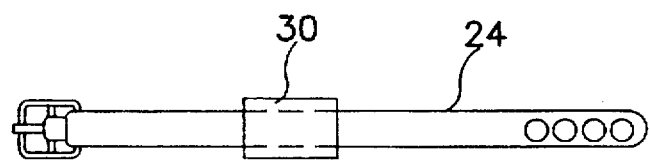
FIG. 2 is a view of a receiver and stimulator unit of the preset invention mounted on a collar that is used to attach the unit to an animal.

Collar 24 to which confinement and bark inhibitor receivers, the processor, and the stimulator unit of system 10 may be attached is shown in FIG. 2. The receivers, processor and stimulation unit are contained within a single housing 30 that is coupled to collar 24 as shown in FIG. 2. Housing 30 of system 10 is relatively small and compact compared with other animal stimulation units. This allows system 10 of the present invention to be used with a larger variety of animals such as small dogs and even cats. Although a particular arrangement for housing 30 is shown in FIG. 2, it is to be understood that the present invention is not limited by this type of collar and mounting arrangement illustrated.

Figure 3:
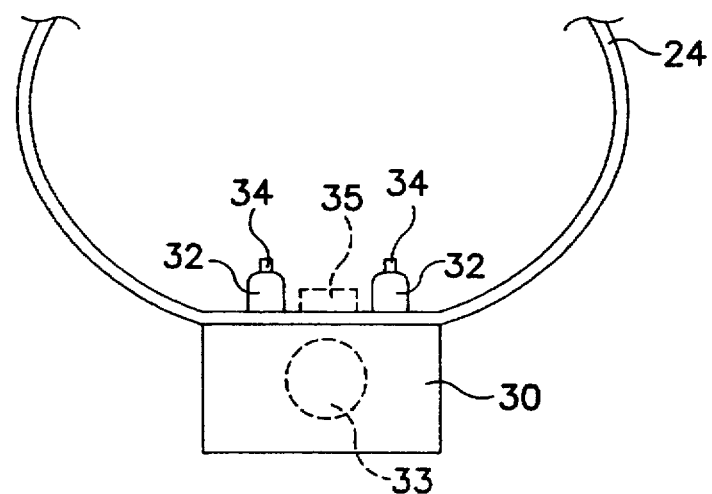
FIG. 3 is a side view of the receiver and stimulator unit shown in FIG. 2 illustrating a pair of probes, ends of which are designed to maintain contact with the skin of an animal so that an electrical potential difference across the probes will be delivered to the animal.

A side view of collar 24 and housing 30 is shown in FIG. 3. A pair of probes or electrodes 32 of system 10 are shown projecting from housing 30. Probes 32 are each formed to include a generally rounded end 34 that is designed to help maintain contact with the skin of animal 16 when collar 24 is secured around its neck. Maintenance of such contact by ends 34 is desirable to help ensure that animal 16 receives electrical stimulation from system 10. Such stimulation appears across probes 32 in the form of an electrical potential difference or open-circuit voltage of a predetermined level. Some other probe designs without such ends have difficulty maintaining conductivity with the skin of the animal, particularly at lower open circuit voltages.

Figure 4:
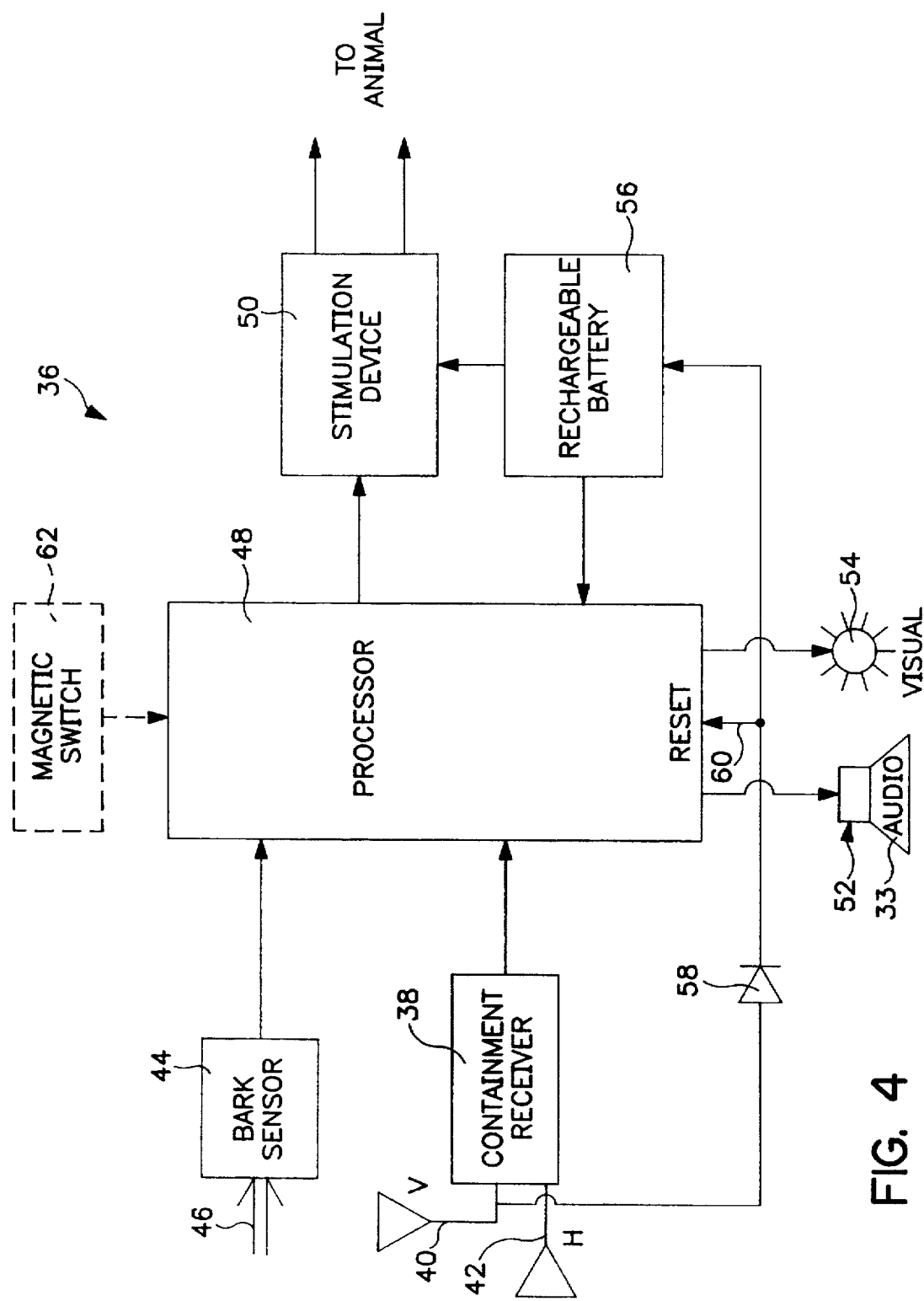
FIG. 4 is a block diagram of a combination animal confinement and bark inhibitor system of the present invention.

A block diagram of an embodiment of a confinement and bark inhibitor system 36 of the present invention is shown in FIG. 4. Block diagram 36 includes a dual channel containment receiver 38 that is tuned to a particular frequency to receive electromagnetic signals through vertical antenna 40 and horizontal antenna 42 that are transmitted by confinement wire 18 and transmitter 22. In one embodiment of system 36, dual channel containment receiver 38 and transmitter 22 are vertically polarized. Vertical and horizontal antennas 40 and 42 provide a greater range of movement by animal 16 while still maintaining a reliable link. Use of dual channel containment receiver 38 allows nearly omnidirectional orientation of the collar receiver without signal nulls or drop out. Although a dual channel receiver 38 is disclosed, it is to be understood that other embodiments of the present invention may use only a single channel receiver.

Unit 36 additionally includes a bark sensor 44 that detects a bark or whining input 46 from animal 16 via such means as a transducer or microphone, as discussed above. Unit 36 also includes a processor or controller 48 that accepts signals from receiver 38 and sensor 44 and uses information contained in these signals to control a stimulation device 50, audio stimulator 52, and visual indicator 54. Processor 48 can include any suitable microprocessor or controller that is programmable to receive information from receiver 38 and bark sensor 44 and utilize this information to drive stimulation device 50 and audio stimulator 52, as well as visual indicator 54.

Unit 36 of the present invention may be powered by a rechargeable battery 56. Battery 56 may be recharged by a signal received through vertical antenna 40 and diode 58. Specifically, a coil in a battery recharger (not shown) is aligned with a coil of vertical antenna 46 so that the two are magnetically coupled. This magnetic coupling, in turn, creates a potential difference sufficient to trigger diode 58 and thereby recharge battery 56. Recharging of battery 56 is thus connectorless. In one embodiment, the electromagnetic signal emanated by the coil in the recharger is designed to be substantially "tuned" to a resonant frequency of vertical antenna 40 for optimal coupling. Battery 56 can include any other suitable rechargeable battery that will provide sufficient power to enable 36 to function. In one embodiment, rechargeable battery 56 is a 3.6 volt, 150 mA NICAD battery pack.

Other embodiments of the present invention may utilize a non-rechargeable energy storage device that is selected to provide long, continued use. This energy storage device maybe a lithium battery. When battery 56 is being recharged, processor 48 is reset, as generally indicated by arrow 60 in FIG. 4.

In one or more embodiments of the present invention, different modes of system 10 are selected by actuating a magnetic switch 62 which is associated with a latch of processor 48 so that each time switch 62 is closed, processor 48 advances to the next mode. In one or more embodiments of unit 36, after battery 56 has been recharged, unit 36 is initially in the confinement only mode. If switch 62 is actuated, unit 36 goes into bark inhibitor only mode. Another actuation of magnetic switch 62 advances unit 36 to confinement and bark inhibitor mode. Another actuation of magnetic switch 62, cycles unit 36 back to confinement only mode, where it can be again cycled through the various modes as discussed above.

Many of the above-described characteristics of the present invention are easily changed by reprogramming processor 48 of unit 36. For example, if an electrical stimulation is used, the intensity can be changed by reprogramming of processor 48. This makes system 10 of the present invention easily configurable to administer a particular set of corrective stimuli as required by the conditions under which it is to be used. Thus, system 10 does not require costly and time consuming reconfiguration, as do hardware only based systems.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A combined animal confinement and bark inhibitor system, comprising:

- a confinement circuit tuned to receive a confinement transmitter signal and output a confinement control signal in response to receipt of the confinement transmitter signal;
- a sensor for detecting vibration of vocal cords of an animal, and for outputting a sensor control signal in response to the vibration of the vocal cords of an animal;
- a stimulation device for administering a stimulus to an animal; and
- a controller associated with the confinement circuit, sensor, and stimulation device, the controller being configured to selectively enable the stimulation device to administer the stimulus to an animal in response to one of only the confinement control signal, only the sensor control signal, and both the confinement control signal and the sensor control signal;
- the system being configured so that one of the confinement control signal and the sensor control signal overrides the other of the confinement control signal and the sensor control signal during substantially simultaneous occurrence of the confinement control signal and the sensor control signal.

2. The system of claim 1, wherein the controller includes one of a microprocessor, a microcontroller, and a decoder.

3. The system of claim 1, further comprising means for fitting the stimulation device to an animal.

4. The system of claim 3, wherein the fitting means includes a collar.

5. The system of claim 1, wherein the stimulus is one of an electrical signal, an audio signal, a spray, and a mechanical stimulus.

6. The system of claim 1, wherein the confinement transmitter signal activates the stimulation device to keep an animal within an area, keep the animal from an object, or keep an animal away from an area.

7. The system of claim 6, wherein the controller is further configured to increase an intensity level of the stimulus administered to the animal as a distance between an animal and a boundary of the area decreases or a distance between an animal and the object decreases.

8. The system of claim 6, further comprising one of a wire and at least one transducer that transmits the confinement transmitter signal.

9. The system of claim 1, wherein the sensor is a bark inhibitor.

10. The system of claim 9, wherein the controller is further configured to increase an intensity level of the stimulus administered to an animal after expiration of a predetermined period of time where the sensor control signal is still output by the sensor.

11. The system of claim 7 or 10, wherein the stimulus is an electrical signal having a voltage magnitude that is increased to increase the intensity level of the stimulus.

12. The system of claim 1, wherein the stimulation device includes at least one probe that delivers an electrical signal to an animal as the stimulus.

13. The system of claim 1, wherein the controller is configured so that the confinement signal overrides the sensor control signal during substantially simultaneous occurrence of the confinement control signal and the sensor control signal.

14. The system of claim 1, wherein the controller is configured so that the sensor control signal overrides the confinement control signal during substantially simultaneous occurrence of the confinement control signal and the sensor control signal.

15. The system of claim 1, further comprising a magnetic switch associated with the controller, and wherein the controller is configured by activating the magnetic switch to enable the stimulation device to administer the stimulus to the animal in response to one of only the confinement control signal, only the sensor control signal, and both the confinement control signal and the sensor control signal.

16. The system of claim 1, wherein the controller is further configured to enable the stimulation device to administer the stimulus for a predetermined period of time to prevent over-stimulation of an animal.

17. The system of claim 1, further comprising a housing in which the sensor, stimulation device, and controller are disposed.

* * * * *